United States Patent
Horio et al.

(10) Patent No.: US 7,840,313 B2
(45) Date of Patent: Nov. 23, 2010

(54) GRID INTERCONNECTION DEVICE, GRID INTERCONNECTION SYSTEM, AND ELECTRIC POWER CONTROL SYSTEM

(75) Inventors: Wataru Horio, Kobe (JP); Kazuo Ito, Hirakata (JP); Masahiro Makino, Ikoma Gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 226 days.

(21) Appl. No.: 12/021,441

(22) Filed: Jan. 29, 2008

(65) Prior Publication Data

US 2008/0179966 A1 Jul. 31, 2008

(30) Foreign Application Priority Data

Jan. 30, 2007 (JP) .............................. 2007-020048

(51) Int. Cl.
G05D 3/12 (2006.01)
G05D 5/00 (2006.01)
G05D 9/00 (2006.01)
H02J 1/00 (2006.01)

(52) U.S. Cl. .................. 700/292; 700/293; 700/286; 307/86

(58) Field of Classification Search .................. 700/292, 700/293, 286; 307/86
See application file for complete search history.

(56) References Cited

U.S. PATENT DOCUMENTS

| 5,592,074 | A | | 1/1997 | Takehara |
| 5,625,539 | A | * | 4/1997 | Nakata et al. ............... 363/17 |
| 5,891,048 | A | * | 4/1999 | Nigam et al. ............... 600/521 |
| 6,188,145 | B1 | * | 2/2001 | Stewart ...................... 307/125 |
| 6,429,546 | B1 | * | 8/2002 | Ropp et al. .................. 307/31 |
| 6,801,442 | B2 | * | 10/2004 | Suzui et al. ................. 363/55 |
| 7,408,268 | B1 | * | 8/2008 | Nocentini et al. ............ 307/16 |
| 2004/0267452 | A1 | * | 12/2004 | Igarashi et al. .............. 701/300 |
| 2005/0049827 | A1 | * | 3/2005 | Yuan et al. .................. 702/179 |
| 2005/0165730 | A1 | * | 7/2005 | Akiyama ..................... 707/1 |
| 2005/0275979 | A1 | * | 12/2005 | Xu ............................. 361/20 |
| 2007/0086133 | A1 | | 4/2007 | Loucks et al. |
| 2008/0238215 | A1 | * | 10/2008 | Ye et al. ..................... 307/127 |

FOREIGN PATENT DOCUMENTS

JP 08-019183 1/1996

* cited by examiner

*Primary Examiner*—Albert DeCady
*Assistant Examiner*—Jason Lin
(74) *Attorney, Agent, or Firm*—Marvin A. Motsenbocker; MOTS Law, PLLC (57) ABSTRACT

Disclosed is a grid interconnection device that converts electric power from a power supply device into predetermined alternating-current power, and interconnects the power supply device to a power distribution system. The grid interconnection device includes a detector that detects islanding of the power supply device, and a receiver that receives power failure information including local area information indicative of an area in which a power failure occurs, through a predetermined transmission path. The detector enhances detection sensitivity for the islanding when the received power failure information includes the local area information indicative of a different area from the area to which the power distribution system belongs.

7 Claims, 6 Drawing Sheets

PRIOR ART    FIG. 1

| TYPE | DETECTION METHOD | REFERENCE ITEM AND REFERENCE VALUE FOR DETECTION | TIME LIMIT |
|---|---|---|---|
| PASSIVE METHOD | VOLTAGE PHASE JUMP DETECTION | PHASE VARIATION: ±3 TO ±10° | WITHIN 0.5 sec |
| | FREQUENCY CHANGE RATE DETECTION | FREQUENCY VARIATION ±0.1 TO ±0.3° | WITHIN 0.5 sec |
| ACTIVE METHOD | FREQUENCY SHIFT METHOD | FREQUENCY BIAS: SEVERAL % OF RATED FREQUENCY | 0.5 TO 1 sec |
| | ACTIVE POWER VARIATION METHOD | ACTIVE POWER: SEVERAL % OF OPERATION OUTPUT | 0.5 TO 1 sec |
| | REACTIVE POWER VARIATION METHOD | REACTIVE POWER: SEVERAL % OF OPERATION OUTPUT | 0.5 TO 1 sec |
| | LOAD VARIATION METHOD | INSERT RESISTANCE: SEVERAL % OF RATED OUTPUT INSERT TIME: WITHIN PERIOD | 0.5 TO 1 sec |

GRID INTERCONNECTION DEVICE, GRID INTERCONNECTION SYSTEM, AND ELECTRIC POWER CONTROL SYSTEM

CROSS REFERENCE TO RELATED APPLICATION

This application is based upon and claims the benefit of priority from the prior Japanese Patent Applications No. 2007-20048 filed on Jan. 30, 2007; the entire contents of which are incorporated herein by reference.

BACKGROUND OF THE INVENTION

1. Field of the Invention

The present invention relates to a grid interconnection device, a grid interconnection system, and an electric power control system configured to convert electric power from a power supply device into predetermined alternating-current power and interconnects the power supply device to a power distribution system.

2. Description of the Related Art

Heretofore, there has been a proposal of a grid interconnection system for home use, which interconnects a power supply device such as a solar power generator, a wind power generator, an engine generator, a storage battery, or a capacitor to a utility power distribution system.

Figure 1:
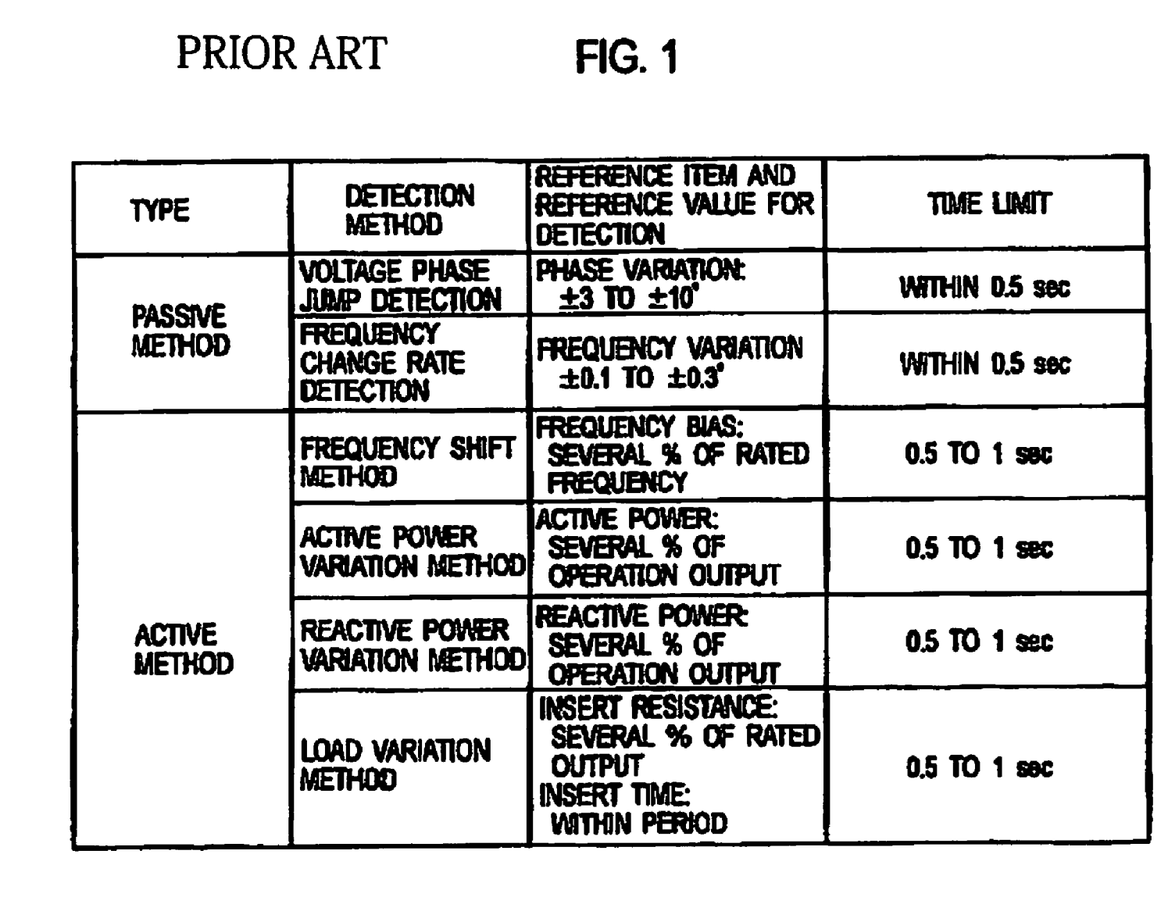
FIG. 1 is a table showing an example of a detection method for detecting an islanding state.

Here, the grid interconnection system includes a detector that detects an islanding state in the event of a power failure in the power distribution system. The grid interconnection system is configured to perform power system separation from the power distribution system so as to prevent islanding when the detector detects the islanding state. For the detector, moreover, a passive method and an active method are specified as methods for detecting the islanding state, as shown in FIG. 1 (see, for example, "Guidelines on distributed power supply grid interconnection technology, JEAG-9701-2001, pp. 37-47," Japan Electric Association, Distributed power supply interconnection technical divisions).

When a power supply device shifts to an islanding, the detector using the passive method detects the islanding state by detecting a change in voltage phase, frequency or the like fed from the power distribution system.

In the active method, a variation is constantly given to active power output, reactive power output or the like of the power supply device. The variation is not detectable when there is power supply from the power distribution system. The detector using the active method detects an islanding state by detecting a change in the frequency or the like, which occurs when the power supply device shifts to the islanding.

As mentioned above, the grid interconnection system prevents the islanding in the event of the power failure in the power distribution system and thereby stops a reverse power flow toward the power distribution system, by using the detector using the passive method or the active method.

However, if plural power supply devices are connected in a given range of bank, and for example, if output power from the power supply devices in the bank balances with power consumption of load in the bank, the islanding state cannot be detected in some cases even though the power failure occurs in the power distribution system.

For a solution to this problem, a "transfer trip method" has recently been proposed (see, for example, Japanese Patent Publication No. H8-19183). In the grid interconnection system using the "transfer trip method," upon occurrence of a power failure in the power distribution system, a transfer trip device of the power distribution system transmits power failure information to the grid interconnection systems in order to inform them of the occurrence of the power failure. The grid interconnection system is configured to stop the operation of the power supply device, upon receipt of the power failure information, according to the power failure information so as to prevent the islanding.

SUMMARY OF THE INVENTION

A first aspect of the present invention is a grid interconnection device (a grid interconnection device 120) which converts electric power from a power supply device (a power supply device 110) into predetermined alternating-current power, and interconnects the power supply device to a power distribution system. The grid interconnection device includes a detector (a detector 125) and a receiver (a communication unit 121). The detector detects islanding of the power supply device, and the receiver receives, through a predetermined transmission path, power failure information including local area information indicative of an area in which a power failure occurs. The detector enhances detection sensitivity for the islanding when the received power failure information includes the local area information indicative of a different area from the area to which the power distribution system belongs.

A second aspect of the present invention is the grid interconnection device according to the first aspect, in which the detector lowers a detection threshold value for detection of the islanding to enhance the detection sensitivity, when the power failure information includes the local area information indicative of the different area from the area to which the power distribution system belongs.

A third aspect of the present invention is the grid interconnection device according to the first aspect which further includes an output controller (an output controller 124). The output controller changes an output condition of the alternating-current power in accordance with the amount of active variation for use in the detection of the islanding. The detector detects the islanding, on the basis of the output condition of the alternating-current power. The output controller changes the amount of active variation to enhance the detection sensitivity for the islanding, when the power failure information includes the local area information indicative of the different area from the area to which the power distribution system belongs.

A fourth aspect of the present invention is the grid interconnection device according to the first aspect, in which the detector includes a first detector and a second detector. The first detector detects the islanding, and the second detector detects the islanding by use of a detection method different from the one used in the first detector. The detector uses the second detector in addition to the first detector to enhance the detection sensitivity, when the received power failure information includes the local area information indicative of the different area from the area to which the power distribution system belongs.

A fifth aspect of the present invention is the grid interconnection device according to the first aspect, in which, after a lapse of a predetermined time after enhancement of the detection sensitivity, the detector resets the detection sensitivity to its original value before the enhancement of the detection sensitivity.

A sixth aspect of the present invention is a grid interconnection system (a grid interconnection system 101), including a power supply device and a grid interconnection device according to the first aspect.

A seventh aspect of the present invention is an electric power control system which includes a power supply device, a grid interconnection device, and a power failure manager. The grid interconnection device converts electric power from the power supply device into predetermined alternating-current power, and interconnects the power supply device to a power distribution system. The power failure manager transmits, through a predetermined transmission path, power failure information to the grid interconnection device in order to inform the grid interconnection device of the occurrence of a power failure. Moreover, the grid interconnection, device includes a detector and a receiver. The detector detects islanding of the power supply device. Through the predetermined transmission path, the receiver receives, from the power failure manager, the power failure information which includes local area information indicative of an area in which a power failure occurs. The detector enhances detection sensitivity for the islanding when the received power failure information includes the local area information indicative of a different area from the area to which the power distribution system belongs.

DETAILED DESCRIPTION OF THE INVENTION

First Embodiment (General Configuration of Electric Power System)

Description will be given with regard to embodiments of the present invention. Incidentally, in the following description of the drawings, the same or similar parts are designated by the same or similar reference characters. It is to be noted that the drawings are schematic ones.

Figure 2:
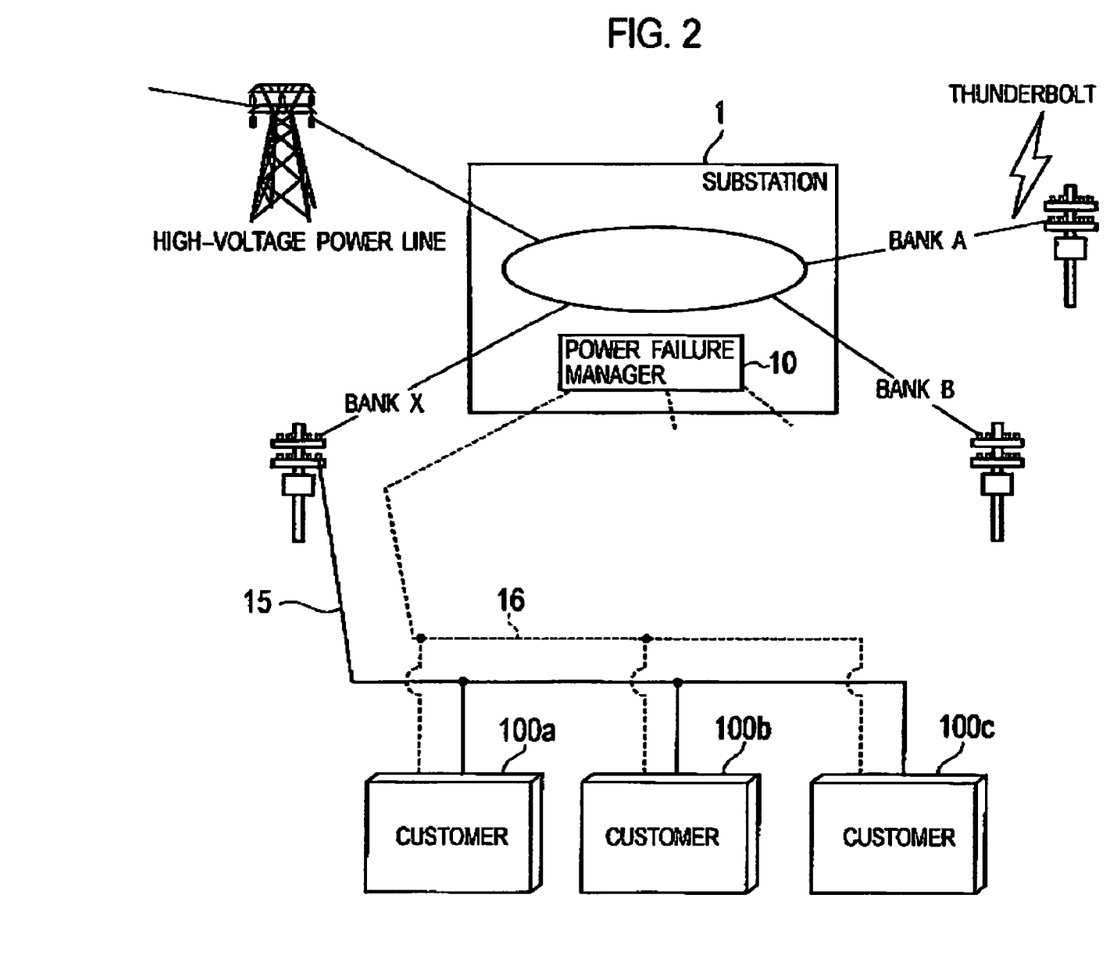
FIG. 2 is a schematic illustration showing the general configuration of an electric power control system that provides grid interconnection according to a first embodiment of the present invention.

FIG. 2 shows the general configuration of an electric power control system that provides grid interconnection according to a first embodiment of the present invention. As shown in FIG. 2, a substation 1 includes plural banks A to X that act as power distribution systems under its control. The substation 1 supplies electric power from a high-voltage power line to the banks A to X. The substation 1 also includes a power failure manager (a transfer trip device) 10.

In the event of a power failure in the banks A to X, the power failure manager 10 uses the transfer trip method to inform the banks A to X of the occurrence of the power failure. Specifically, the power failure manager 10 transmits power failure information to all grid interconnection systems in the banks A to X in order to inform these systems of the occurrence of the power failure, in the event of the power failure due to a thunderbolt or the like in any one of the banks A to X under the control of the substation 1. The power failure information is the information for use in the transfer trip method, which serves to inform the systems of the occurrence of the power failure. Here, the power failure information according to the first embodiment includes the following information.

1. Operation Information

"Presence or absence of power failure," which indicates whether or not power has been cut off (or the power is shut down).

2. Local Area Information

"Provider information," which indicates a provider that provides electric power (e.g., THE KANSAI ELECTRIC POWER CO., INC.).

"Area information," which indicates an area in which a power failure occurs (e.g., Hirakata-shi, Osaka).

"Grid information," which is an identification that identifies the banks (e.g., the bank A).

"Specific information," which indicates the cause of the power failure (e.g., a thunderbolt), downtime (e.g., the downtime between 21:00 and 23:00, etc.), the type of power supply device, public facilities or general facilities, etc.

The local area information is the information indicative of an area in which a power failure occurs. Incidentally, the local area information includes the "provider information," the "area information," the "grid information," the "specific information," and so on, as the information indicative of the area. Incidentally, the local area information, as employed in the first embodiment, serves as the information indicative of the area to which the banks belong, as well as the information indicative of the area in which a power failure occurs. Given as an example are the "provider information" (e.g., THE KANSAI ELECTRIC POWER CO., INC.) indicative of the area which all the banks X and A and B belong to, the "area information" (e.g., Hirakata-shi, Osaka) indicative of the area which the banks A and B belong to, and so on. In other words, the local area information is the information that enables determining the banks belonging to the area in which a power failure occurs. For the first embodiment, moreover, description will be given mainly with regard to an instance where the local area information includes the "grid information" that identifies the banks.

In the first embodiment, moreover, the power failure manager 10 transmits the power failure information to the bank X through a signal line 16. Incidentally, an image shown for example in FIG. 2 represents the occurrence of the power failure in the bank A due to a thunderbolt.

In the bank X, electric power is supplied to customers 100a to 100c through a power transmission line 15 which the bank X is provided with.

The customers 100a to 100c are, for example, ordinary households and the like provided with power supply devices to be mentioned later, and have grid interconnections to the bank X that acts as the power distribution system. Also, the customers 100a to 100c receive the power failure information transmitted from the power failure manager 10 through the signal line 16. Also, the signal line 16 may be configured of a wired line such as power line communication using the power transmission line 15, a telephone line, or an optical fiber, or may be configured of a wireless line such as a paging network, a digital cellular network, a wireless LAN, 802.11x-based wireless network. Distribution by radio wave, such as BS, CS, TV, radio, or a radio wave clock, is also included in the wireless line. The distribution by radio wave, although generally intended for a wide area, has the same effect as distribution limited to the customers in a given area, because the power failure information includes the "provider information" and the "area information" mentioned above.

(Power Distribution Configuration of the Customer)

Figure 3:
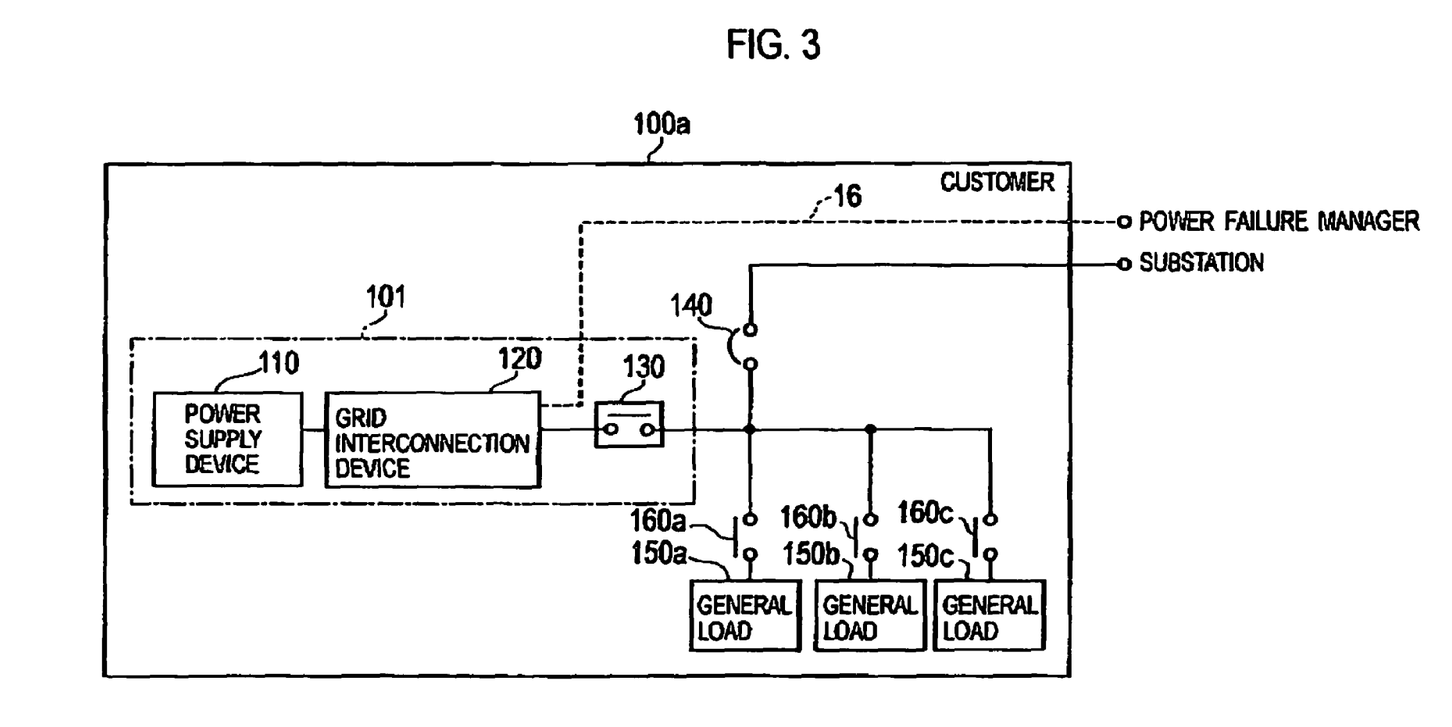
FIG. 3 is a block diagram showing the power distribution configuration in a household, of a power customer according to the first embodiment of the present invention.

Description will be given with regard to the configurations of the customers 100a to 100c. Incidentally, for the first embodiment, description will be given focusing on the customer 100a, since the power distribution configurations of the customers 100a to 100c are substantially the same. FIG. 3 is a block diagram showing the power distribution configuration of the customer 100a.

The customer 100a includes a grid interconnection system 101, a grid interconnection breaker 140, general loads 150a to 150c, and breakers 160a to 160c. Also, the grid interconnection system 101 includes a power supply device 110, a grid interconnection device 120, and an interconnection relay 130.

The power supply device 110 is assumed to be a power output device such as a solar power generation system, a wind power generation system, a fuel cell power generation system, a storage battery system, or a capacitor system. Also, the power supply device 110 controls starting, stopping and other operations under control of the grid interconnection device 120. Incidentally, the power supply device 110 may include a hot water storage device, or the like, the description of which is omitted from the first embodiment.

The grid interconnection device 120 converts electric power from the power supply device 110 into predetermined alternating-current power (e.g., 200 volts AC) and interconnects the power supply device 110 to the bank X. Also, the grid interconnection device 120 receives the power failure information transmitted from the power failure manager 10 through the signal line 16. Also, the grid interconnection device 120 is connected to the power transmission line 15 with which the bank X is provided and to the power supply device 110, and detects an islanding state of the power supply device 110. Specifically, the grid interconnection device 120 uses the active method and the passive method to detect the islanding state. Then, when the islanding state is detected, the grid interconnection device 120 turns off the interconnection relay 130 to separate the interconnection with the power distribution system.

The interconnection relay 130 is turned off or turned on to provide the interconnection to the bank X or separation from the bank X under control of the grid interconnection device 120. The grid interconnection breaker 140 detects an overcurrent and is turned off to protect wiring such as the power transmission line 15. The general loads 150a to 150c are household electrical appliances and the like that form loads, such as a refrigerator, lighting equipment, a television, and an air conditioner. The breakers 160a to 160c are circuit breakers for pro leering wiring in the customer 100a.

(Configuration of the Grid Interconnection Device)

Specific description will be given with reference to FIG. 4 with regard to the configuration of the grid interconnection device 120. Also, description will be given below mainly with regard to parts related to the present invention. It is to be therefore noted that the grid interconnection device 120 may include a functional block (such as a power supply device) essential for implementation of the function of the grid interconnection device, which is not shown, or the description of which is omitted.

Figure 4:
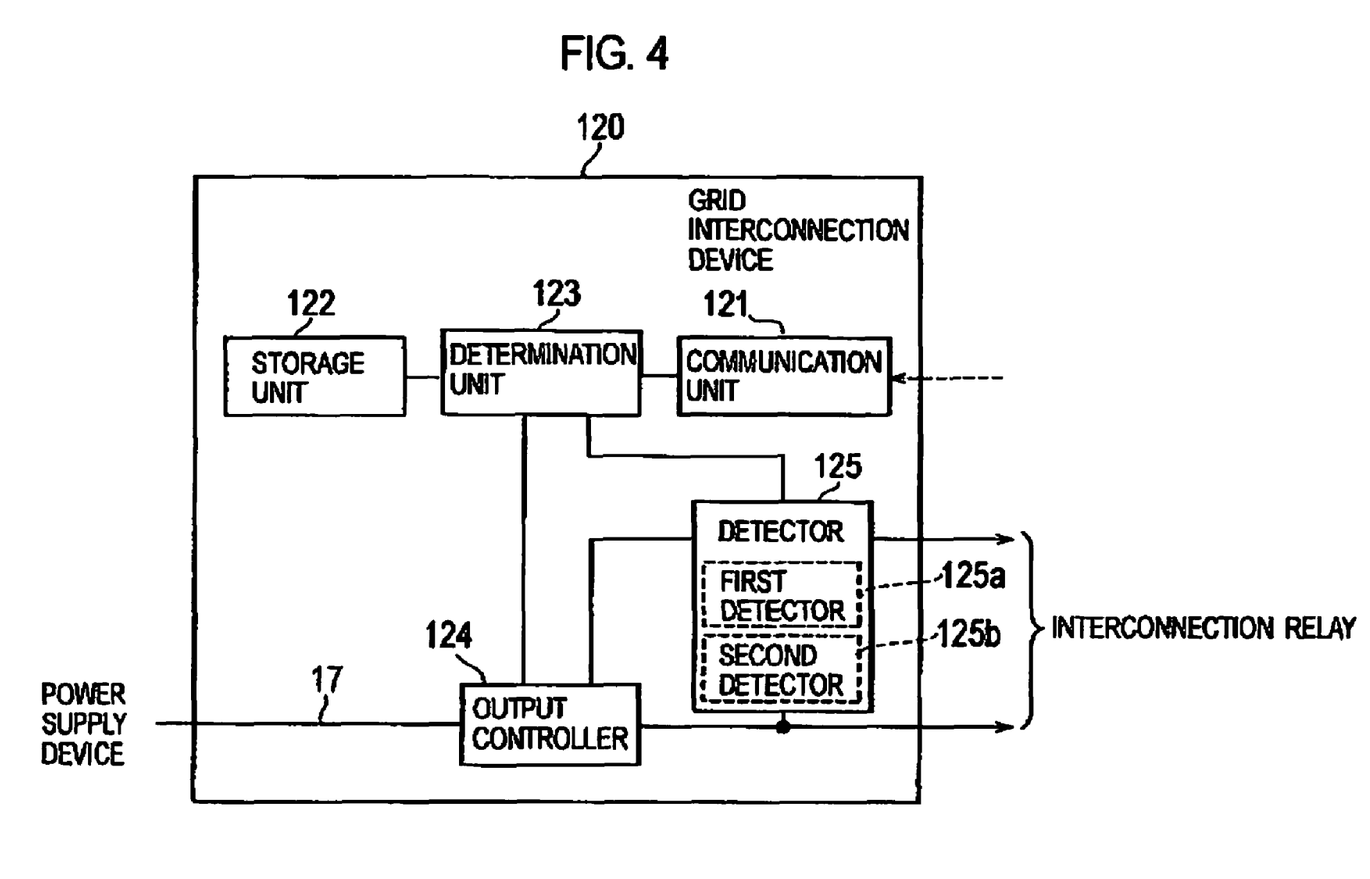
FIG. 4 is a block diagram showing the configuration of a grid interconnection device according to the first embodiment of the present invention.

As shown in FIG. 4, the grid interconnection device 120 includes a communication unit 121, a storage unit 122, a determination unit 123, an output controller 124, and a detector 125. The communication unit 121 receives the power failure information transmitted from the power failure manager 10. The communication unit 121 according to the first embodiment constitutes a receiver that receives the power failure information indicative of the occurrence of the power failure in the banks A to X through a predetermined transmission path. Incidentally, the predetermined transmission path refers to the wired line or the wireless line formed by the signal line 16 mentioned above, or the distribution by radio wave. The power failure information includes the local area information indicative of the area in which a power failure occurs, such as the banks A to X under the control of the substation 1 in which a power failure occurs.

The storage unit 122 stores the "provider information," the "area information," and the "grid information" (e.g., the bank X), which the power distribution system belongs to, as the local area information. The storage unit 122 also prestores the "grid information" (e.g., the banks A and B) that identifies other banks under the control of the substation 1.

The determination unit 123 determines whether or not the local area information contained in the power failure information received by the communication unit 121 is different from the local area information indicative of the interconnected power distribution system.

Specifically, the determination unit 123 refers to the storage unit 122 to determine whether or not the "grid information" contained in the local area information of the power failure information is the "grid information" (e.g., the banks A and B) mat identifies other banks, stored in the storage unit 122. The determination unit 123 men informs the output controller 124 of the result of decision. Also, the determination unit 123 includes an internal timer. When the "grid information" contained in the power failure information is the "grid information" that identifies other banks, the determination unit 123 starts the timer and determines whether or not a predetermined time has elapsed. Then, the determination unit 123 informs the output controller 124 of the result of decision. Incidentally, the predetermined time is assumed to be one minute, five minutes, ten minutes, twenty minutes, or the like. In the first embodiment, moreover, the determination unit 123 may be configured to determine whether or not the "provider information" contained in the "local area information" of the power failure information is different from the "provider information" stored in the storage unit 122, or may be configured to determine whether or not the "area information" contained in the "local area information" of the power failure information is different from the "area information" stored in the storage unit 122.

The output controller 124 functions as a power converter that converts the electric power from the power supply device 110 into the predetermined alternating-current power (e.g., 200 volts AC) and outputs the alternating-current power. The output controller 124 uses the active method to detect islanding. Then, the output controller 124 outputs the alternating-current power whose output condition is varied according to the amount of active variation for use in detection of the islanding. Incidentally, changing the output condition is to change the output condition according to the amount of active variation prestored, for example, to change the amount of frequency shift, the amount of reactive power or active power variation (or equivalently, the amount of phase variation), the amount of output power variation, or the amount of load variation, as will be described in detail later.

The output controller 124 also changes the amount of active variation in the output condition of the alternating-current power when the power failure information received by the communication unit 121 includes the local area information indicative of a different area from the area to which the interconnected power distribution system belongs.

Specifically, the output controller 124 increases the amount of active variation, when the determination unit 123 determines that the bank indicated by the "grid information" contained in the local area information of the power failure information is a different bank from the bank X interconnected to the power supply device 110 (e.g., the bank A or B.) The amount of active variation is increased so as to enhance the detection sensitivity of the detector 125 (to be described later) to the islanding state.

After increasing the amount of active variation, the output controller 124 also resets the amount of active variation to its original value after a lapse of the predetermined time. Specifically, after increasing the amount of active variation (for example, increasing it by $\alpha$ to $\Delta f+\alpha$), the output controller 124 resets the increased amount of active variation to the original value (e.g., $\Delta f$) and outputs it upon receipt of information from the determination unit 123, stating that the predetermined time has elapsed.

The detector 125 is connected to a power transmission line 17 to which the electric power from the power supply device 110 is fed. Also, the detector 125 detects whether or not the power supply device 110 of the customer 100a is under the islanding state. Specifically, the detector 125 detects a change in the output condition (e.g., parameters such as a current value, a voltage value, a phase, and a frequency) of the fed electric power, by use of a detection method based on either one or both of the active method and the passive method, to thereby detect the islanding state.

The detector 125 also lowers a detection threshold value for detection of the islanding for the predetermined period of time, when the power failure information received by the communication unit 121 includes the local area information indicative of the different area from the area to which the interconnected power distribution system belongs. Specifically, the detector 125 lowers the detection threshold value for detection of the islanding, for use in the active method or the passive method, when the determination unit 123 determines that the bank indicated by the "grid information" contained in the local area information of the power failure information is the different bank from the interconnected bank X (e.g., the bank A or B.) The detection threshold value is lowered so as to enhance the detection sensitivity for the islanding state.

When the islanding state is detected, the detector 125 also transmits a control signal to the interconnection relay 130 to turn off it and thereby separate the power transmission line 15 from the power supply device 110.

(How to Enhance the Detection Sensitivity)

Description will be given below with regard to an instance where the amount of frequency shift, the amount of phase variation, and the amount of load variation are increased as the amount of active variation.

For example when the detector 125 uses a frequency shift method included in the active method, the output controller 124 increases the amount of frequency shift by a predetermined amount for the predetermined period of time. Incidentally, the frequency shift method is to operate the grid interconnection device 120 at a lower or higher frequency than a system frequency (for example at a frequency about 0.1% lower or higher man the system frequency) and thereby detect the change in the frequency under the islanding state. Here, when the change in the frequency occurs in the output from the power distribution system, the islanding can be detected by increasing the amount of frequency shift to a higher value than normal.

When the detector 125 uses a reactive power variation method included in the active method, the output controller 124 may also increase the amount of reactive power variation (or equivalently, the amount of phase variation) by a predetermined amount for the predetermined period of time. Incidentally, the reactive power variation method is to cause a minute variation in output reactive power from the grid interconnection device 120 or the power supply device 110 and thereby detect the change in the frequency or current under the islanding state. When the detector 125 uses an active power variation method included in the active method, the output controller 124 may likewise increase the amount of active power variation (or equivalently, the amount of output current amplitude variation) for the predetermined period of time. Incidentally, the active power variation method is to cause a minute variation in output active power from the grid interconnection device 120 and thereby detect the change in the frequency or voltage under the islanding state.

When the detector 125 uses a load variation method included in the active method, the output controller 124 may also increase the amount of load variation by a predetermined amount for the predetermined period of time. Incidentally, the load variation method is to insert a minute load disposed externally to the grid interconnection device 120 or the power supply device 110 into the system for a short time at given intervals and thereby detect the change in the voltage or current that coincides with the insertion interval. Here, when the variation in the voltage or current occurs in the output from the power distribution system, the islanding can be detected by increasing or reducing the load to a higher or lower value than normal to increase the amount of load variation.

Incidentally, the passive methods include a voltage phase jump detection method, a third harmonic voltage distortion upsurge detection method, a frequency change rate detection method, and so on. The voltage phase jump detection method is to detect the amount of sharp change in the phase of a system voltage at the time of transition from an interconnected condition to the islanding state. The third harmonic voltage distortion upsurge detection method is to detect the amount of sharp change in the distortion of the system voltage at the time of the transition from the interconnected condition to the islanding state. The frequency change rate detection method is to detect the amount of sharp change in the system frequency of the system voltage at the time of the transition from the interconnected condition to the islanding state.

Here, the detected parameters for the passive methods undergo variations, although slight, when the power supply device is islanding state even in a situation where in the power distribution system the output from the grid interconnection system 101 balances with the load. For example, there are variations in the detected parameters (namely, the phase, a third harmonic distortion factor, and the rate of change in frequency) for use in the voltage phase jump detection method, the third harmonic voltage distortion upsurge detection method, and the frequency change rate detection method. For each of the above methods, by lowering the detection threshold value, detectivity can be improved even when detection is impossible at the normal detection threshold value.

Likewise, the detected parameters for the active methods undergo variations, although slight, when the power supply device is islanding state in the situation where in the power distribution system the output from the grid interconnection system 101 balances with the load even when there is a normal amount of variation. The detection threshold value is lowered in order to detect the variation in each parameter.

Furthermore, when the active method is used, the output controller 124 may greatly reduce the output power from the power supply device 110 to the power distribution system for the predetermined period of time so that the detector 125 detects an undervoltage to thereby detect the islanding. For example, assume that operation takes place under a condition where the output from the grid interconnection device 120 is 4000 W and the voltage of the power distribution system is 200 V. The output current is 20 A, since the output voltage from the grid interconnection device 120 is equal to the voltage of the power distribution system, which is 200 V. Here, assume that the load is equivalent to the resistance, for the sake of simplicity of explanation. A load of 4000 W leads to the application of a voltage of 200 V and the passage of a current of 20 A and hence to a load resistance value of 10Ω. Here, assuming that a power failure has occurred in the power distribution system and that the output from the grid interconnection device 120 is reduced to, for example, 2000 W, the output current is 10 A. Thus, this leads to the passage of a current of 10 A through the load having a resistance of 10Ω, resulting in an output voltage of 100 V.

On the other hand, the grid interconnection device monitors the voltage value of the power distribution system. When there is a change in the output voltage, the grid interconnection device judges it as an abnormal condition. Under the condition mentioned above, therefore, detection of a voltage drop enables detection of the abnormal condition and hence detection of the islanding. Moreover, when the power supply device is islanding state even in the situation where in the power distribution system the output from the grid interconnection system 101 balances with the load, the output from the power supply device 110 to the power distribution system is greatly reduced to produce the change in the current or voltage phase. This is because the load under the power distribution system has impedance characteristics. The islanding may be detected by detecting the change in the phase.

(Operation of the Grid Interconnection System)

Description will now be given with reference to FIG. 5 with regard to the operation of the grid interconnection system 101 having the above-mentioned configuration. Specifically, description will be given with regard to control operation which the grid interconnection device 120 of the grid interconnection system 101 performs when it receives the power failure information transmitted from the power failure manager 10. Incidentally, description will be given here, taking an instance where the operation information contained in the power failure information indicates the "presence of power failure," that is, an instance where a power failure occurs in a different bank and the power failure information is the information that informs the system of the occurrence of the power failure.

At step S11, the communication unit 121 receives the power failure information transmitted from the power failure manager 10, and transmits the power failure information to the determination unit 123.

At step S13, the determination unit 123 refers to the "grid information" stored in the storage unit 122 to determine whether or not the "grid information" (e.g., the bank A) contained in the power failure information is the "grid information" (e.g., the bank A or B) on the different bank. Incidentally, on this occasion, the determination unit 123 may determine whether or not the "provider information" contained in the "local area information" of the power failure information is different from the "provider information" stored in the storage unit 122, or may determine whether or not the "area information" contained in the "local area information" of the power failure information is different from the "area information" stored in the storage unit 122.

When the determination unit 123 determines that the "grid information" is not the "grid information" on the different bank, at step S15, the determination unit 123 sets a flag to "0" and informs the output controller 124 that the flag is "0."

When the determination unit 123 determines that the "grid information" is the "grid information" on the different bank, at step S17 the determination unit 123 determines whether or not the predetermined time preset in the internal timer started at the time of conversion of the output power value has elapsed. Incidentally, when the determination unit 123 has not previously started the timer, the determination unit 123 judges it as "No," then starts the timer, and also goes to step S19 to perform operation.

When the determination unit 123 determines that the predetermined time preset in the timer has not elapsed yet, at step S19 the determination unit 123 sets the flag to "1" and informs the output controller 124 that the flag is "1."

When the determination unit 123 determines that the predetermined time has elapsed, at step S21 the determination unit 123 sets the flag to "0" and informs the output controller 124 that the flag is "0."

At step S22, the output controller 124 determines whether or not the determination unit 123 informs the output controller 124 that the flag is "1."

When the output controller 124 determines that the determination unit 123 informs the output controller 124 that the flag is "0," at step S23*a*, the output controller 124 sets the amount of active variation to its normal setting (e.g., the normal Δf value) and change it The output controller 124 also sets the detection threshold value for detection of the islanding, which is preset in the detector 125, to the normal threshold value (e.g., the normal th value), on the basis of the active method and the passive method.

When the output controller 124 determines that the determination unit 123 informs the output controller 124 that the flag is "1," at step S23*b*, the output controller 124 sets the amount of active variation to the amount of variation (e.g., Δf+α) increased to the higher value than the normal setting (e.g., the normal Δf value) and change it. The output controller 124 also sets the detection threshold value for detection of the islanding, which is preset in the detector 125, to the lower threshold value (e.g., the high-sensitivity th value) than the normal threshold value, based on the active method and the passive method.

In the manner as above mentioned, on the occasion of receipt of the power failure information indicative of the occurrence of the power failure in other banks, the grid interconnection device 120 converts the output power value of the electric power inputted from the power supply device 110 and outputs the converted output power value of the electric power. The grid interconnection device 120 also uses the detector 125 to detect the islanding state. Also, steps S11 to S23 are repeatedly executed every time the power failure information is received.

Incidentally, the above-mentioned grid interconnection device 120 is configured to, at steps S11 to S23, use the "grid information" as the local area information indicative of the area, contained in the power failure information, so as to change the detection threshold value and the amount of active variation according to whether or not the "grid information" is the "grid information" indicative of a different bank from its own bank. However, the grid interconnection device 120 may be configured to use the "provider information," the "area information," or the "specific information" as the local area information so as to change the detection threshold value and the amount of active variation according to whether or not the "provider information," the "area information," or the "specific information" is the information indicative of a different area.

When the "grid information" contained in the local area information of the power failure information received at the above step S11 includes the "grid information" (e.g., the bank X) on the same bank, the determination unit 123 may be also configured to direct the detector 125 to turn off the interconnection relay 130 so as to immediately separate the interconnection, without having to perform the step S13 of making a determination.

(Operation for Detecting the Islanding State)

Figure 6:
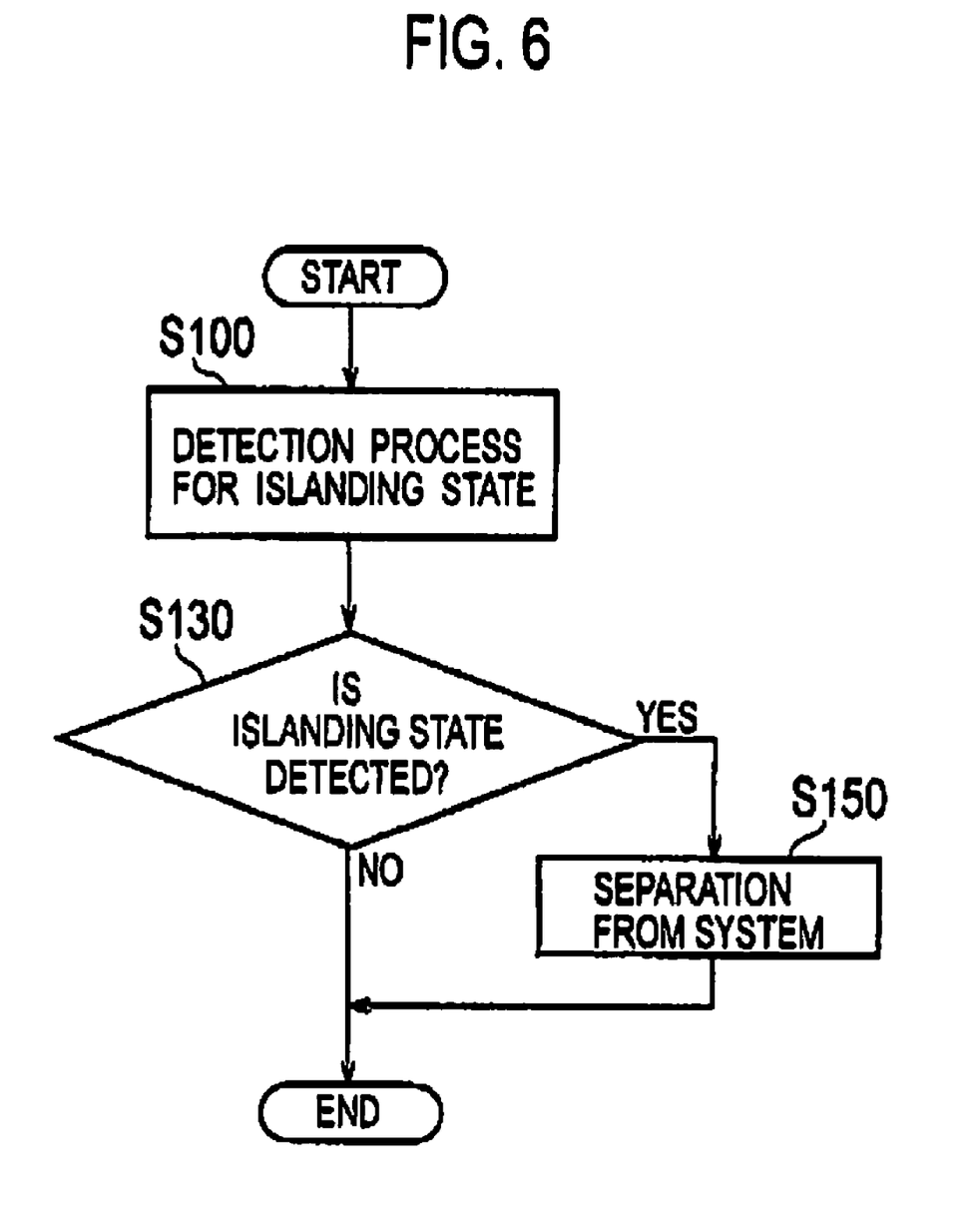
FIG. 6 is a flowchart showing operation of the grid interconnection system according to the first embodiment of the present invention.

Description will now be given with reference to FIG. 6 with regard to operation which the grid interconnection device 120 performs to detect the islanding state.

At step S100, the detector 125 performs a detection processing for detecting the islanding state. Specifically, the detector 125 detects the power value, the frequency, or the like, on the basis of the detection threshold value for use in the passive method and the active method, set at the above-described step S23.

At step S130, the detector 125 determines whether or not the islanding state is detected. Incidentally, when the islanding state is not detected, the detector 125 brings the operation to an end.

When the islanding state is detected, at step S150 the detector 125 transmits the control signal to the interconnection relay 130 to turn off it and thereby separate the power transmission line 15 from the power supply device 110.

Incidentally, the grid interconnection device 120 executes the above steps S100 to S150 at regular intervals.

(Functions and Advantageous Effects)

According to the grid interconnection system 101 according to the first embodiment, the grid interconnection device 120 receives the power failure information for use in the transfer trip method, which informs the system of the occurrence of the power failure. Then, the grid interconnection device 120 enhances the detection sensitivity for the islanding when the received power failure information includes the local area information indicative of the different area from the area (e.g., the bank X) to which the interconnected power distribution system belongs. Specifically, when the power failure occurs in the different bank, the grid interconnection device 120 lowers the detection threshold value of the detector 125 by the predetermined amount On this occasion, the grid interconnection device 120 also increases the amount of active variation in the output condition of the alternating-current power by the predetermined amount.

In the manner as above mentioned, the grid interconnection device 120 enhances the detection sensitivity for the islanding state in the event of the power failure in the different bank. Accordingly, the grid interconnection device 120 can immediately detect the islanding state in the event of the power failure in the area to which the bank X belongs. Consequently, the grid interconnection device 120 can detect the islanding state with higher accuracy in the grid interconnection system in which the transfer trip method is employed.

Moreover, the grid interconnection device 120 can prevent erroneous detection of the islanding, since the grid interconnection device 120 lowers the detection threshold value or increases the amount of active variation by the predetermined amount, only for the predetermined period of time upon the occurrence of the power failure in the different bank.

Second Embodiment (Configuration of the Grid Interconnection System)

It is to be understood that the present invention is not limited to the above embodiment and that various changes and modifications may be made in the invention. As shown in FIG. 4, the detector 125 according to a second embodiment of the present invention includes a first detector 125a that detects the islanding state, and a second detector 125b that is different from the first detector 125a. Also, the detector 125 according to the second embodiment uses the second detector 125b in addition to the first detector 125a to detect the islanding state, when the received power failure information includes the local area information indicative of the different area from the area to which the power distribution system belongs.

Specifically, under normal conditions, the detector 125 uses the first detector 125a to detect the islanding state. The first detector 125a uses, for example, the voltage phase jump detection method included in the passive method. When the local area information of the received power failure information includes the "grid information" (e.g., the bank A or B) indicative of the different area from the area to which the bank X belongs, the detector 125 then further uses the second detector 125b in addition to the first detector 125a to detect the islanding state. The second detector 125b uses the frequency change rate detection method included in the passive method.

Figure 5:
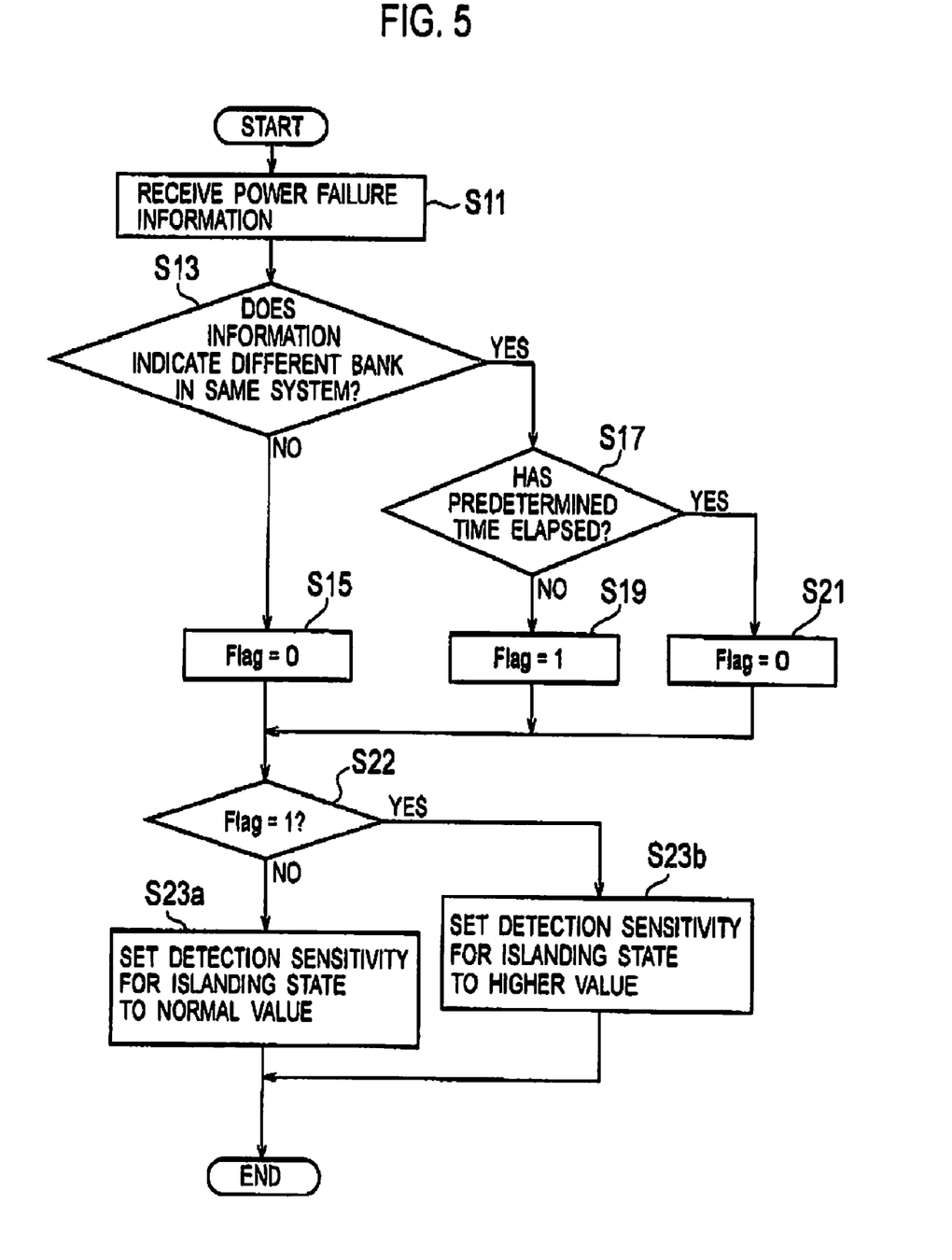
FIG. 5 is a flowchart showing operation of a grid interconnection system according to the first embodiment of the present invention.

For example, when the output controller 124 determines that the determination unit 123 informs the output controller 124 that the flag is "0," at step S23a shown in FIG. 5, the output controller 124 sets the detector 125 to use the first detector 125a, which uses the voltage phase jump detection method included in the passive method, in order to detect the islanding state (that is, the output controller 124 sets the detector 125 to normal detection mode).

Moreover, when the output controller 124 determines that the determination unit 123 informs the output controller 124 that the flag is "1," at the above-described step S23b, the output controller 124 sets the detector 125 to use the first detector 125a, which uses the voltage phase jump detection method, and the second detector 125b, which further uses the frequency change rate detection method, in order to detect the islanding state (that is, the output controller 124 sets the detector 125 to high-sensitivity detection mode).

Incidentally, the detection methods used by the first detector 125a and the second detector 125b are not limited to the voltage phase jump detection method and the frequency change rate detection method. Other detection methods based on the active method or the passive method may be used.

(Functions and Advantageous Effects)

According to the grid interconnection system 101 of the second embodiment, in the grid interconnection device 120, the output controller 124 sets the detector 125 to further use the frequency change rate detection method in addition to the voltage phase jump detection method in order to detect the islanding state, when the "grid information" contained in the received power failure information as the local area information indicative of the area to which the interconnected power distribution system belongs is the "grid information" (e.g., the bank A or B) indicative of the different bank in the same system, that is, when the power failure occurs in the different bank.

Thus, the grid interconnection device 120 can detect the islanding state with higher accuracy, because of using plural detection methods to detect the islanding state in the event of the power failure in the interconnected bank X.

Other Embodiments

As mentioned above, this invention has been described in connection with one embodiment of the invention. However, it is to be understood that the description and drawings that form part of this disclosure are not intended to limit the scope of the invention. It should be apparent from this disclosure that various alternatives could be made thereto by those skilled in the art.

For example, in the grid interconnection system according to the first embodiment mentioned above, the output controller 124 is configured to execute both the operation for increasing the amount of active variation and the operation for lowering the detection threshold value of the detector 125. However, any one of these operations may be performed to enhance the detection sensitivity. Specifically, the output controller 124 may be configured to execute only the operation for increasing the amount of active variation, without lowering the detection threshold value.

Also, a combination of the embodiments is possible. Of course, it is to be understood that the invention may include various embodiments and so on, which are not described herein. The scope of the invention is therefore to be determined solely by the appended claims.

What is claimed is:

1. A grid interconnection device that converts electric power from a power supply device into predetermined alternating-current power and, interconnects the power supply device to a power distribution system, the grid interconnection device comprising:
    a detector configured to detect islanding of the power supply device; and
    a receiver configured to receive power failure information including local area information indicative of an area in which a power failure occurs, through a predetermined transmission path,
    a determination unit configured to determine whether or not local area information contained in the power failure information is different from local area information Indicative of the interconnected power distribution system,
    wherein the detector enhances detection sensitivity for the islanding when the determination unit determines that the local area information Included in the power failure information differs from the area information indicative of the interconnected power distribution system.

2. The grid interconnection device according to claim 1, wherein the detector enhances the detection sensitivity by lowering a detection threshold value for detection of the islanding, when the determination unit determines that the local area information included in the power failure information differs from the area information indicative of the interconnected power distribution system.

3. The grid interconnection device according to claim 1, further comprising an output controller configured to change an output condition of the alternating-current power according to an amount of active variation used for detecting the islanding,
    wherein the detector detects the islanding on the basis of the output condition of the alternating-current power, and
    the output controller enhances the detection sensitivity by changing the amount of active variation, when the determination unit determines that the local area information included in the power failure information differs from the area information indicative of the interconnected power distribution system.

4. The grid interconnection device according to claim 1, wherein the detector includes;
    a first detector configured to detect the islanding; and
    a second detector configured to detect the islanding by use of a different method from that of the first detector,
    wherein the detector enhances the detection sensitivity by using the second detector in addition to the first detector, when the determination unit determines that the local area information included in the power failure information is different from the area information indicative of the interconnected power distribution system.

5. The grid interconnection device according to claim 1, wherein when a predetermined time passes after enhancement of the detection sensitivity, the detector resets the detection sensitivity to original level used before the enhancement of the detection sensitivity.

6. A grid interconnection system, comprising:
    a power supply device; and
    the grid interconnection device according to claim 1.

7. An electric power control system, comprising:
    a power supply device;
    a grid interconnection device configured to convert electric power from the power supply device into predetermined alternating-current power, and to interconnect the power supply device to a power distribution system; and
    a power failure manager configured to transmit power failure information to the grid interconnection device through a predetermined transmission path, in order to inform the grid interconnection device of the occurrence of a power failure,
    wherein the grid interconnection device includes:
    a detector configured to detect islanding of the power supply device; and
    a receiver configured to receive the power failure information from the power failure manager through the predetermined transmission path, the power failure information including local area information indicative of an area in which a power failure occurs,
    wherein the detector enhances detection sensitivity for the islanding when the received power failure information includes the local area information indicative of a different area from the area to which the power distribution system belongs.

* * * * *